United States Patent
Williams et al.

(10) Patent No.: US 9,367,855 B2
(45) Date of Patent: Jun. 14, 2016

(54) TELEPHONY BASED REWARD SYSTEM

(75) Inventors: David Lothele Williams, Menlo Park, CA (US); Rohan Koduvayur Krishnan Chandran, Sunnyvale, CA (US); Kelvin Voon-Kit Chong, Mountain View, CA (US); Srinivas A. Mandyam, San Jose, CA (US); Krishna Vedati, Los Altos, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 583 days.

(21) Appl. No.: 13/310,584

(22) Filed: Dec. 2, 2011

(65) Prior Publication Data

US 2013/0144704 A1     Jun. 6, 2013

(51) Int. Cl.
  *G06Q 30/00*  (2012.01)
  *G06Q 30/02*  (2012.01)
  *H04M 15/00*  (2006.01)

(52) U.S. Cl.
  CPC ....... *G06Q 30/0226* (2013.01); *H04M 15/8083* (2013.01); *H04M 2215/0192* (2013.01)

(58) Field of Classification Search
  CPC ..................... G06Q 30/0207; G06Q 30/0251
  USPC ........................................................ 705/14
  See application file for complete search history.

(56) References Cited

U.S. PATENT DOCUMENTS

| | | | |
|---|---|---|---|
| 8,800,857 B1 * | 8/2014 | Butler | G06Q 30/0212 235/375 |
| 2002/0046116 A1 * | 4/2002 | Hohle et al. | 705/14 |
| 2004/0064371 A1 * | 4/2004 | Crapo | 705/14 |
| 2010/0017284 A1 * | 1/2010 | Ross et al. | 705/14.33 |
| 2010/0106587 A1 * | 4/2010 | Walker et al. | 705/14.23 |
| 2011/0071913 A1 * | 3/2011 | Chakiris et al. | 705/17 |
| 2011/0313874 A1 * | 12/2011 | Hardie | H04W 4/02 705/26.1 |
| 2012/0010930 A1 * | 1/2012 | Langdon et al. | 705/14.16 |
| 2012/0101881 A1 * | 4/2012 | Taylor et al. | 705/14.13 |
| 2012/0290389 A1 * | 11/2012 | Greenough et al. | 705/14.53 |
| 2012/0296716 A1 * | 11/2012 | Barbeau et al. | 705/14.13 |
| 2013/0023291 A1 * | 1/2013 | Pilskalns | 455/456.3 |
| 2013/0030900 A1 * | 1/2013 | Nicholson | 705/14.23 |
| 2013/0041725 A1 * | 2/2013 | Moore et al. | 705/14.1 |
| 2013/0218710 A1 * | 8/2013 | Golden et al. | 705/26.3 |
| 2013/0232017 A1 * | 9/2013 | Nathanel et al. | 705/16 |
| 2014/0058796 A1 * | 2/2014 | Getchius | 705/7.34 |

* cited by examiner

*Primary Examiner* — Matthew L Hamilton
(74) *Attorney, Agent, or Firm* — Alston & Bird LLP

(57) ABSTRACT

The present disclosure describes a system and method for managing through telephony systems a customer reward system, such as, a spend and get reward system. In one embodiment, a virtual punch card ("VPC") customer loyalty reward program system and method are managed through a telephonic communication connection provider.

20 Claims, 3 Drawing Sheets

TELEPHONY BASED REWARD SYSTEM

FIELD

The present application relates to managing through telephony systems a customer spend and get reward system and method, and more specifically a virtual punch card ("VPC") system and method.

BACKGROUND

So called "spend-and-get" customer reward systems have been in place for some time. In such systems the customer buys a certain amount of a product or a service of a vending merchant or service provider and gets so many more of the item or service for free. Except for buy-one-get-one-free or the like systems, redeemable by one trip to the establishment of the merchant, such systems are typically managed by the customer retaining some purchase record, such as a so-called "punch card." The merchant or employee/agent of the merchant validates a purchase each time the customer goes to the merchant's place of business and makes the purchase. The disclosed subject matter provides improvements in such systems.

DETAILED DESCRIPTION

Figure 1:
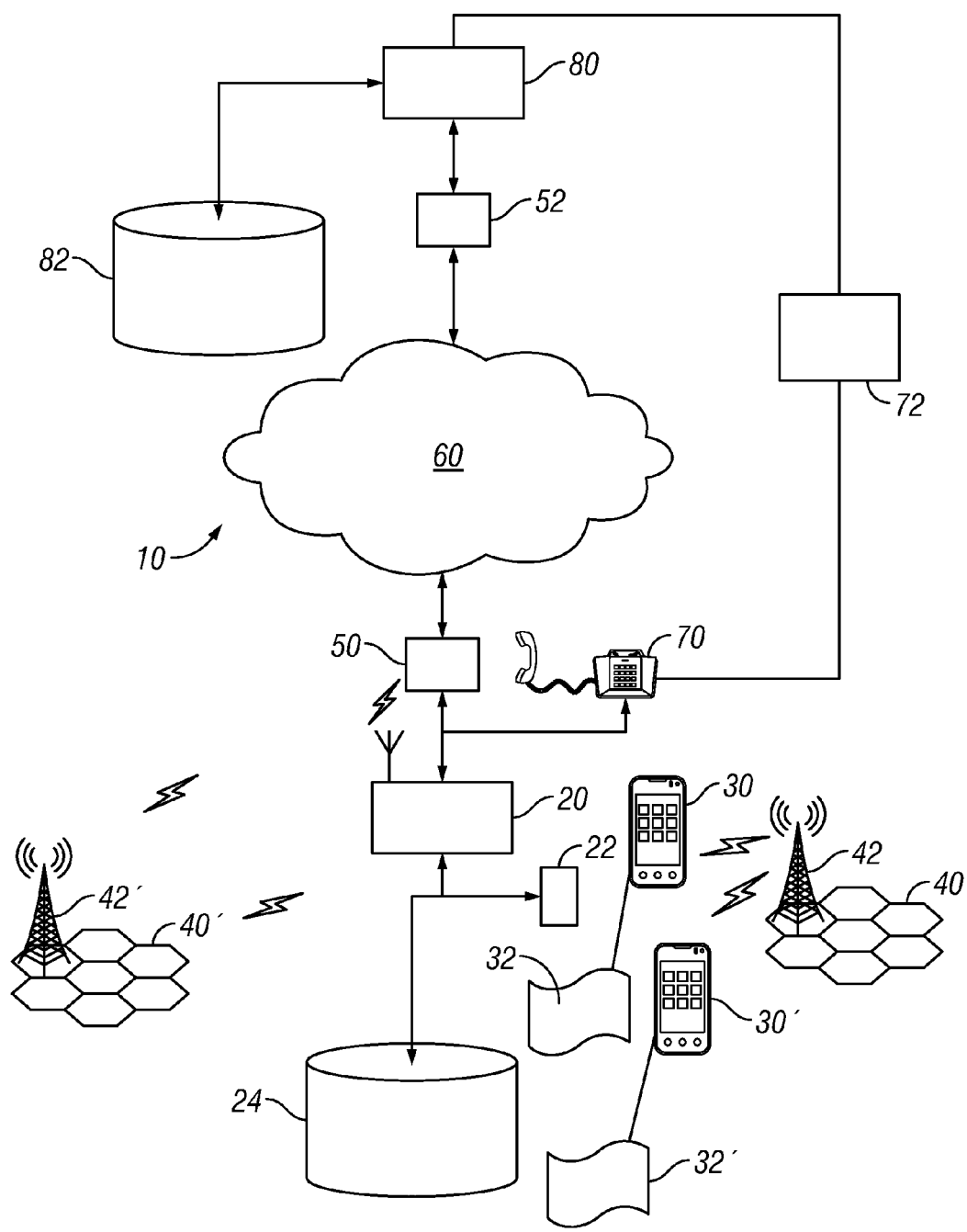
FIG. 1 shows in schematic and partly block diagram form a virtual punch card ("VPC") customer loyalty reward program system according to aspects of embodiments of the disclosed subject matter.

The present disclosure describes aspects of embodiments of a system and method for managing through telephony systems a customer reward system, such as, a spend and get reward system. More specifically the system and method of the disclosed and claimed subject matter relates to a virtual punch card ("VPC") customer loyalty reward program system and method managed through a telephonic communication connection provider. According to aspects of the disclosed and claimed subject matter a system and method for managing through telephony systems a customer reward system, such as, a spend and get reward system, can be implemented utilizing a mobile communication device of a customer, such as the customer's mobile phone to be a customer interface or touch point into a customer reward system, such as, a spend and get customer reward system.

According to aspects of embodiments of the disclosed subject matter, merchants can more effectively and efficiently issue customer rewards for those customers coming into the merchant's establishment and purchasing an item or a service. The item, in one example, for illustrative purposes only, can be a cup of coffee and a service could be, as an example, for illustrative purposes only, a full lunch service. Rewards achievable by the purchase of a certain number of items or services, or certain amount of total purchases, can also take various other forms besides, e.g., a free good or a service. As examples the earned rewards could be in the form of allowing purchasing preferences, redemption for an early boarding on a plane, use of express check out in the grocery store with greater than the limit of items, etc.

In the one illustrative example a customer can, e.g., walk into a local café, and order a latte style cup of coffee. The customer provides a telephony identifier, such as a telephone number or user ID, e.g., for a mobile communication device of the customer, such as the customer's mobile phone number. The merchant can record the number in any of a number of ways discussed in more detail below, and then communicate with a "virtual punch card" reward system service ("VPC reward system service"). This communication with the VPC reward system service can use a telephone device, but can occur in other ways as well, as noted below. The VPC reward system service "punches" the customer's virtual "punch card." The virtual punch card can be maintained in a database accessible to a computing device, such as a server, at the VPC reward system service. A copy of the VPC can be retained on the customer mobile communications device as well. If the customer has enough stored virtual "punches," the VPC reward system service, e.g., through the service system server, notifies the merchant, e.g., using a telephony system, but also possibly by other means, and the customer gets the free item or service.

The merchant can have a customer reward system employing, e.g., the mobile number of the customer and an application to receive the customer's mobile telephony device ID, such as the customer's cell phone number. The customer and the merchant can be enrolled in or registered with the VPC reward system service. Alternatively, the merchant can be so enrolled, and can in turn enroll customers that approach the merchant for participation in the merchant's VPC reward system. As noted below, a number of means may be provided for both merchant and customer enrollment with the VPC reward system service.

Alternatively, the virtual punch card system, e.g., managed by a telephonic communications connection provider can be informed by the merchant, e.g., through the network, that a qualifying purchase has been made. The connection provider, through, e.g., a virtual punch card loyalty program server, can determine if the customer is enrolled. If not, the connection provider server can call the customer, e.g., using the communication network, and offer enrollment to the customer. Once enrolled the customer can begin accumulating virtual punch card points for the qualifying purchases with the merchant, including the one just made.

According to aspects of embodiments of the disclosed subject matter the method and system can be arranged in two layers, one relating to the customer and one relating to the merchant. A customer can have a customer account ("CA") which may be unique to the customer, but at the same time useable in a plurality of different business establishments. Thus, the customer can frequent a number of unrelated business establishments and have one VPC "punched" at each establishment to record various perhaps differing qualifying purchases.

The customer may then receive a reward, a free cup of coffee or sandwich as an example, after a predetermined number of "punches" on the VPC account of the customer for all of the different merchants with which the customer's VPC account is registered. That is, the customer can get the free coffee or free sandwich or the like after a predetermined number of general VPC points ("punches") regardless of whether the total is reached by earning the points at more than one merchant establishment during the accumulation of the points. In some cases, the entity managing the VPC system for the plurality of merchants and the one customer, or one or more of the merchants themselves, may grant a customer free VPC points. Of course, the various merchant establishments also can be linked, e.g., various locations for the same franchise restaurant chain, etc.

Thus, the customer may be enticed to enter an establishment, e.g., having been located by the mobile communication device connection provider as in the vicinity of one or more of the merchants for which the VPC account(s) is useable to obtain the free item or service, in order for the connection provider or merchant(s) to get the customer's business right away. This encourages sales at the merchant where the customer goes to redeem the reward and plays up the benefits of the VPC reward system to the customer for the benefit of the merchant(s) involved on the customer's VPC account (whether chosen for redeeming the accumulated predetermined number of points or not). From the customer standpoint, the customer does not have to carry a plurality of spend-and-get reward system punch cards. At the same time, however, the system is also capable of maintaining and managing a number of different customer loyalty program virtual punch card accounts, for merchants that wish the maintain the traditional model of spend at the one merchant and eventually obtain the reward from that merchant.

From the point of view of the merchant, the merchant does not have to deal with the punch cards or other physical records of the qualifying purchases. To do so can be time consuming, disruptive of other customers, e.g., waiting in line to pay their bill, etc. So far as the merchant is concerned, the customer comes into the establishment(s) the appropriate number of times and makes the appropriate number of qualifying purchases to achieve the threshold reward level, and claims the free item or service.

As noted above, the merchant or merchants can be given an ability to market to the customer, e.g., with free points, or a temporary reduction in the required threshold for redemption. As an example the customer may be in the vicinity of a VPC account merchant(s), or the competitor of such a merchant(s), or has just run a search engine search for the appropriate goods or services or for competitor of the VPC account participating merchant(s), etc. This information, may be combined by the VPC reward program service provider and/or the merchant along with other information, such as the status of the particular customer's VPC account with the merchant, customer profile information, time of day or day of the week or seasonal information, etc.

Focused and targeted promotions may then be directed to the customer, whether or not in combination with promotions directed to current customer VPC status (e.g., the customer is near a redemption threshold or has not accumulated any points in the particular VPC account for more than some threshold time, etc.). Such real time offers can be part of or in addition to some other coordinated message to the customer from a merchant(s), such as if the customer redeems the accumulated predetermined (or real-time-offer reduced) number of points, the merchant will grant an additional reward. additional rewards could be, e.g., another spend-and-get reward on the spot at the merchant establishment, a free scone to go with the rewarded cup of coffee, a free desert to go with the VPC account award of a free dinner entree, etc.

Such real time offers can be the result of the merchant having access to the aggregate data regarding the VPC account customer loyalty program reward system, or, as noted above, other data available from the customer, the connection provider, etc. That is, the merchant may be made award that the customer accumulates points towards an item or service of the merchant regularly every morning, due, e.g., to the location of the merchant's establishment to the customer's home or place of work, etc. Similarly, such targeted advertisement of such offers can be not only related to a predicted or known current location of the customer, but time limited. As an example the promotion could be for, e.g., a merchant establishment(s) near the customer's home at about the time the customer's commute begins, or near the customer's place of business after the commute is done, but limited for some selected time period, e.g., before the usual lunch break, etc.

According to aspects of embodiments of the disclosed subject matter, the customers and merchants can upload an application enabling the performance of a process, thus become a part of a VPC system (enrolling). For example, the customer may download an application to the customer's mobile communication device, such as the customer's mobile phone, to manage/coordinate the customer's VPC account virtual reward account virtual card(s). The necessary application may reside in the network, e.g., available in the Internet, such as through a web-site/page, or on the customer's mobile communication device itself. The application may reside on a communication device of the merchant. In the latter two cases, the communication devices of the customer and the merchant may be provided by the same connection provider.

Upon such downloading, the customer can be registered with the connection provider or with the merchant(s), or both, and given a VPC account identifier, such as a VPC account rewards code. As an example, the customer can upload the customer's mobile communication device phone number and/or use the phone to register, and the customer data can be obtained by or from the connection provider and/or merchant to identify the customer to the assigned customer VPC account coded identifier.

The coded identifier may be the phone number itself. The account may serve as an aggregation of all of the customer's VPC "punch cards" for the customer account and the various merchants. When loaded or accessible from the customer's mobile communication device or even from the merchant's communication device or Internet site, etc., instead of carrying around dozens of punch cards, the customer's mobile communication device constitutes a VPC for each merchant VPC account of the customer. A database maintained by the merchant or the customer loyalty reward VPC program connection provider server, or a combination of the two, and perhaps also the customer mobile communication device, can serve as the VPC account of the customer for any given merchant(s).

Upon entering the establishment of the merchant the customer can give the merchant or agent of the merchant the account number, e.g., the mobile communication device phone number. The merchant can forward this information, e.g., to the customer loyalty reward program VPC server at the connection provider or a server controlled by the merchant. this report can constitute an indication that the customer with a certain VPC account number visited the establishment of the merchant and in some embodiments made a qualifying purchase, which entitles the customer to a VPC point(s). Customer information may be available to the merchant or made available to the merchant, e.g., from registration information for the VPC account, customer information relating to the mobile communication device, etc. The customer/merchant may also interface with the VPC account, e.g., through the VPC account server, using, e.g., interactive voice recognition ("IVR") software.

According to aspects of embodiments of the disclosed subject matter, the method and system can provide/integrate analytics relating to obtaining and analyzing information in the VPC account system server(s). This information may include location of the customer, e.g., utilizing location determination programs, e.g., using GPS on a smart phone, mobile phone base station cross correlation locations systems, in-store locators, etc. Location may be presumed, e.g., through the merchant reporting the qualifying sale at the merchant's establishment.

Using such information, as an example, the merchant can be enabled to validate such information as that the customer has become entitled to receive a reward or is very close to doing so. Other forms of validation may include that the customer has received the actual reward, redeemed the qualifying VPC account reward. the merchant may also have validated that the qualification for the reward has been removed from the VPC account.

Some or all of these validations may make the customer in the merchant's eye a good target for a promotion of some kind, as noted above, due, e.g., to location, time of day, day of the week, season of the year, etc. In addition, e.g., through a system interface allowing, e.g., for user Interaction, the customer and/or merchant or connection provider VPC account program administrator can view/manipulate the information regarding rewards, account information, utilization history, current customer location, etc. By way of example, the customer loyalty program VPC server, applying logical business rules to this information/data, may suggest to the merchant(s) a VPC account(s) appearing ripe for a particular selected type of promotion, relating to obtaining more VPC points or in combination with doing so or separate from the VPC account per se.

According to aspects of embodiments of the disclosed subject matter, the VPC account system and method may utilize other means for the customer/merchant(s) to enter, e.g., qualifying purchase information. As an example, a smart phone of the customer may be provided with a bar code or other similar encoded and perhaps encrypted display of an account code. The customer's mobile communication device number can be, e.g., scanned at the check-out station of the merchant's establishment for purposes of inputting information about the account having been credited with a qualifying purchase. The merchant or agent of the merchant may scan the displayed code. Thus, e.g., instead of verbally or otherwise providing the mobile communication device phone number each time a qualifying purchase is made, the customer may hand the phone with the display to the merchant or agent of the merchant for scanning and uploading with qualifying purchase information to the VPC account on the server identified through the coded display.

Other ways to upload the qualifying purchase information to the customer's VPC account by the merchant verifying also that there was in fact a qualifying purchase made can be envisioned. The customer may call the merchant, e.g., as a special phone number provided by the merchant or by the connection provider to the merchant and enter the customer's VPC account code identifying the customer. The code may be identified by the mobile communication device used by the customer to call the merchant. The call may be made while the customer is in the check out line, or when the customer has received the check for payment, or the like. The merchant may interact in some way with the call to verify the qualifying purchase.

The customer may call the connection provider or a VPC account management server at the connection provider. The connection provider or the customer VPC account or customer mobile communication device account management server may call the merchant for some interaction to verify the occurrence of a qualifying purchase. The merchant may call the connection provider and interactively enter the customer's VPC account identifier. The merchant may access a web page/site served by the connection provider or connection provider VPC account management server and enter the customer's number and the purchase made. The merchant may download from the connection provider or connection provider server codes identifying the customer(s) with a VPC account(s) associated with the merchant, especially after the first trip by the customer to the establishment of the merchant, i.e., while a spend-and-get promotion for the given customer is active. The merchant may then otherwise identify such a customer and use such a listing to report a qualifying purchase. Other variations can be envisioned.

Additional features and functionalities can help the customer manage and use the VPC system and method. As one example, the VPC system and method can in real time automatically sort the customer's VPC account "cards," e.g., based on the location of the customer. That is the accounts pertinent to a given street location or with a given shopping mall may be organized and listed in front of all other accounts. As an example, the factors of distance of the customer from each given merchant establishment on the street or in the mall, or time of day and historical usage of the particular account as relates to time of day, or both, and other criteria for sorting may be utilized.

As another example, sorting may be done by the account(s) closest to reaching the predetermined redemption quantity of qualifying purchases or which have outstanding additional promotional offers, by distance, value, time of day, etc. Further levels of sorting may be utilized. Other aids to the customer may include, e.g., a visual representation of the VPC on the top of the list based on the sorting criteria(ea) may be displayed on the display of the mobile communication device. Reminders may be issued to the customer(s) by the connection provider and/or merchant(s), e.g., through instant messaging, email, screen displays, phone calls and IVR interactions and prompts, etc., Such messaging may be used, as an example, to notify the customer that a VPC account is near maturity, another promotion is being made available, etc.

According to aspects of embodiments of the disclosed subject matter, neither the customer nor the merchant needs to have a smart phone. All that is required is that the customer have a mobile communication device, such as a mobile phone, with a corresponding unique identifier of the customer associated with the mobile communication device. According to another advantage, a customer can easily and conveniently accumulate a large number of VPC accounts and then utilize that fact to market the customer to the merchants, e.g., to solicit promotions and rewards beyond redemption after the accumulation of the predetermined number of qualifying purchases. As an example, because of location of the customer near a competitor of the merchant, or the VPC account of the customer with a competitor of the merchant is about to reach the predetermined redemption status the customer himself/herself may be able to leverage this to the advantage of inducing the merchant to make a special promotion to the customer to deflect business from the competitor.

Connection providers, developing an understanding of crowd sourcing, e.g., from VPC account management etc., and from other experience, can engage both merchants and subscribers and, e.g., suggest how each can benefit from participation in a VPC reward account program. As noted above, rewards can be made interchangeable amongst participating merchants. This can further benefit all merchants. Collectively, the respective merchants in the group of merchants can, e.g., attract a customer who perhaps does not visit a the respective merchant's establishment, or does so rarely. Because of proximity of location of the customer and proximity of an available qualifying purchase that results in qualifying for a reward in real time, the merchant less frequently visited may be visited now in real tome by the customer. Other merchant promotions can be made convertible into VPC account points ("punches").

According to aspects of embodiments of the disclosed subject matter customers may be allowed to pool or share VPC account qualifying purchase points with others, e.g., by electronically transferring points. For example, a merchant(s) may require that all points for the purpose of adding to the merchant's offered reward be by the result of qualifying purchases from the merchant only. However, the merchant/connection provider may allow one customer with enough of such qualifying purchase VPC account points. The other customer may transfer those points to in exchange, e.g., for points toward the other customer reaching the redemption level with another merchant with similar requirements for qualifying purchases. This form of exchanging points may be managed by the customer loyalty reward program VPC account management server, e.g., at a connection provider.

Groups such as families, coworkers, churches, etc. may accumulate shared VPC account qualifying purchase points and, e.g., in the latter case at least, then transfer them to a needy individual/entity for redemption. The connection provider and/or the merchant(s) may open a subscription service for subscribers to earn points with qualifying purchases credited to a single account, and also, e.g., donate the points for redemption by a needy individual/entity. The connection provider and/or merchant(s) may allow accelerated redemption for a lesser valued reward or allow the customer to purchase needed additional VPC account points to reach the redemption level. As an example, the VPC account management server, using logical business rules for example, or the merchant, for a customer near the redemption level, but also not having been in the merchant establishment before, or having been very infrequently in the past, may be allowed to purchase points to induce a current sale while the customer is currently in the merchant's establishment. The server or merchant may forgive the requirement for the extra points lacking or offer the reward at a discounted price instead of for free, to reflect the lacking points, but to encourage the sale here and now.

According to aspects of embodiments of the disclosed subject matter other forms of incentivization and motivation to visit the establishment(s) of a merchant(s) may be utilized. As an example, the merchant may provide offers of points or other promotions to friends of the customer to come and join the customer at the merchant's establishment within some period of time. The merchant who has not been visited by a former customer with a VPC account for some period of time may offer extra points and/or some other promotion for the customer to come in to the merchant's establishment and make a qualifying purchase. Extra points per qualifying purchase may be an incentivization, especially, as noted above, for a customer near the redemption qualifying point.

A customer may be encouraged by such incentive(s) to come into the merchant's establishment on a day or at a time when the customer does not usually do so or when the merchant is undergoing a slow period of customer traffic in the merchant's establishment. Similarly, a customer who frequents the merchant's establishment more than some usual rate of visiting the establishment may be given extra points. Special sign up bonus awards of points or other promotions may be given. In this regard, sharing information with the merchant, e.g., establishing a customer profile by answering questions provided by the connection provider and/or the merchant(s) may be cause for the granting of extra points. The merchant or connection provider may provide incentives and other VPC account information to the customer in other ways than through the customer's mobile communication device, e.g., on the check or sale record printed by the merchant, e.g., at a point of sale device, or on the customer's monthly bill for communication services, etc.

Turning now to FIG. 1 there is shown in schematic and block diagram form an example of a virtual punch card ("VPC") system 10 according to aspects of an embodiment of the disclosed subject matter. The system 10 may include a merchant server 20, which may be connected to a point of sale interface 22, e.g., a terminal at the establishment of the merchant used for payment for purchases by customers of goods or services, e.g., through a consumer payment system payment device, such as a credit card. The merchant server 20 may also be connected to a merchant database 24. The merchant database may be used by the merchant to store and manipulate data relating to purchases by customers of goods or services, the management of the VPC system and method and other related functionalities for the merchant to manage inventory, stocking tax related matters and the like.

As part of the VPC system 10 according to aspects of embodiments of the disclosed subject matter, customers may interface with the merchant server and/or the point of sale interface 22 through the user of customer mobile communication devices, such as a customer smart phones 30 or 30' for respective customers. The phones 30, 30' may each respectively be utilizing functionality(ies) embodied in respective mobile communications device applications 32, 32'. The cell phones 30, 30', whether smart phones or not. may be in wireless connection to a part of the telephonic communications system through a cell telephone grid 40 and a respective cell telephone base station tower 42 within the grid. A second cell telephone grid 40' may be being utilized by one of the respective customer mobile communication devices, such as cell phones 30, 30' or by the merchant, e.g., through the merchant server 20 or other merchant telecommunications device (not shown).

The merchant server 20 or other telephonically capable device (not shown) may be connected to a connection provider server 80 through the Interned 60. This may occur, as an example, through a gateway 50 on the merchant end and a gateway 52 on the connection provider server end 80 end. The merchant server 20 may also be in telephonic communication with the connection provider server 80 through a switch-based telephone network 72, as an example through a standard ground line or wired line handset 70 as part of the merchant customer equipment, and which may, e.g., be embedded in the merchant server 20 and/or in the point of sale interface 22.

Figure 2:
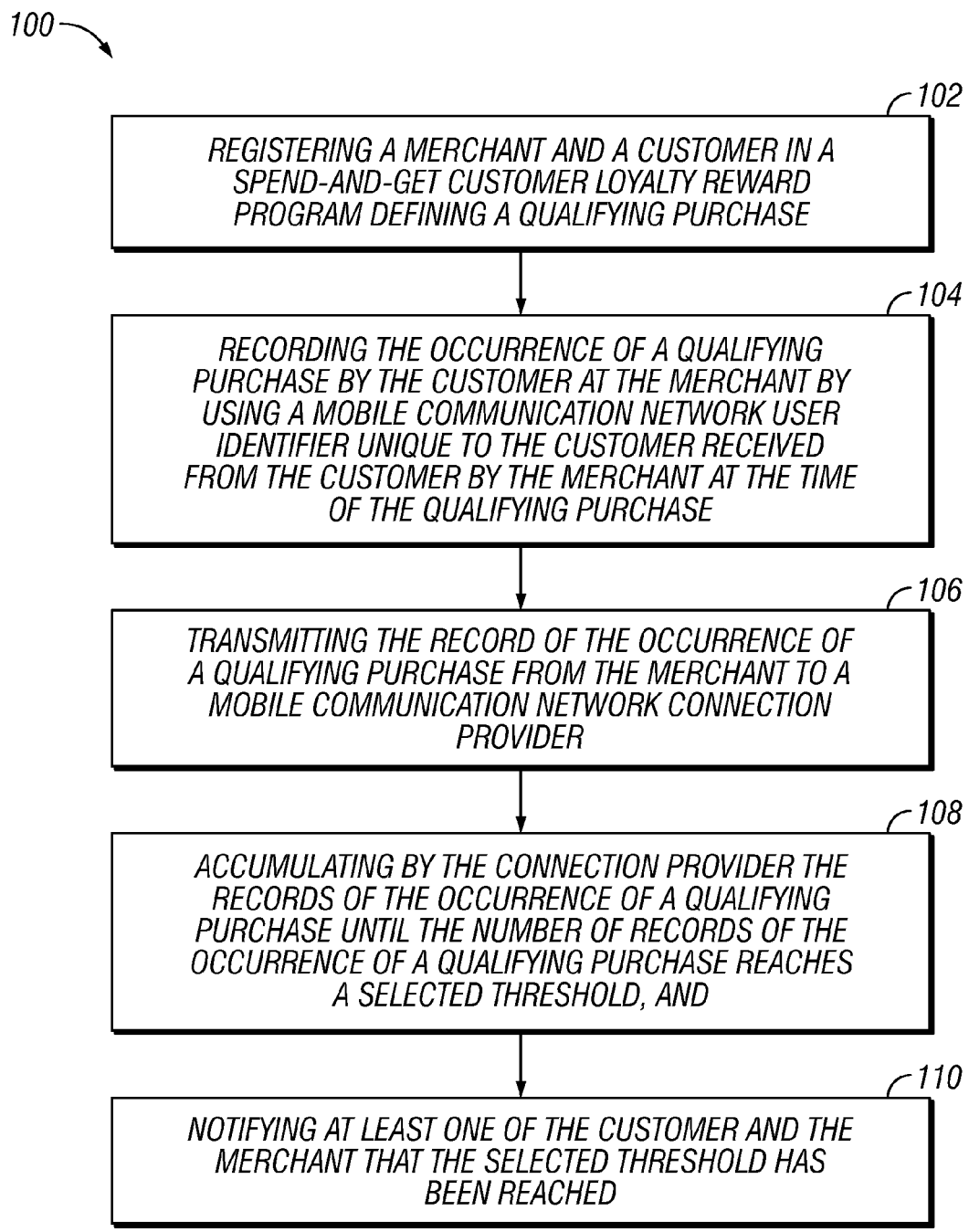
FIG. 2 shows in block diagram form a flow of a virtual punch card ("VPC") customer loyalty reward method according to aspects of an embodiment of the disclosed subject matter.

Turning now to FIG. 2 there is shown in block diagram form a flow of a VPC customer reward process 100 according to aspects of an embodiment of the disclosed subject matter. The process 100 can involve, e.g., registering a merchant and a customer in a spend-and-get customer loyalty reward program defining a qualifying purchase in block 102. The process 100 can also involve recording the occurrence of a qualifying purchase by the customer at the merchant by using a mobile communication network user identifier unique to the customer, received from the customer by the merchant at the time of the qualifying purchase, as illustrated in block 104. Illustrated in block 106 is the process of transmitting the record of the occurrence of a qualifying purchase from the merchant to a mobile communication network connection provider. Block 108 illustrates accumulating by the connection provider the records of the occurrence of a qualifying purchase until the number of records of the occurrence of a qualifying purchase reaches a selected threshold. The process 100 can also involve notifying at least one of the customer and the merchant that the selected threshold has been reached in block 110.

Figure 3:
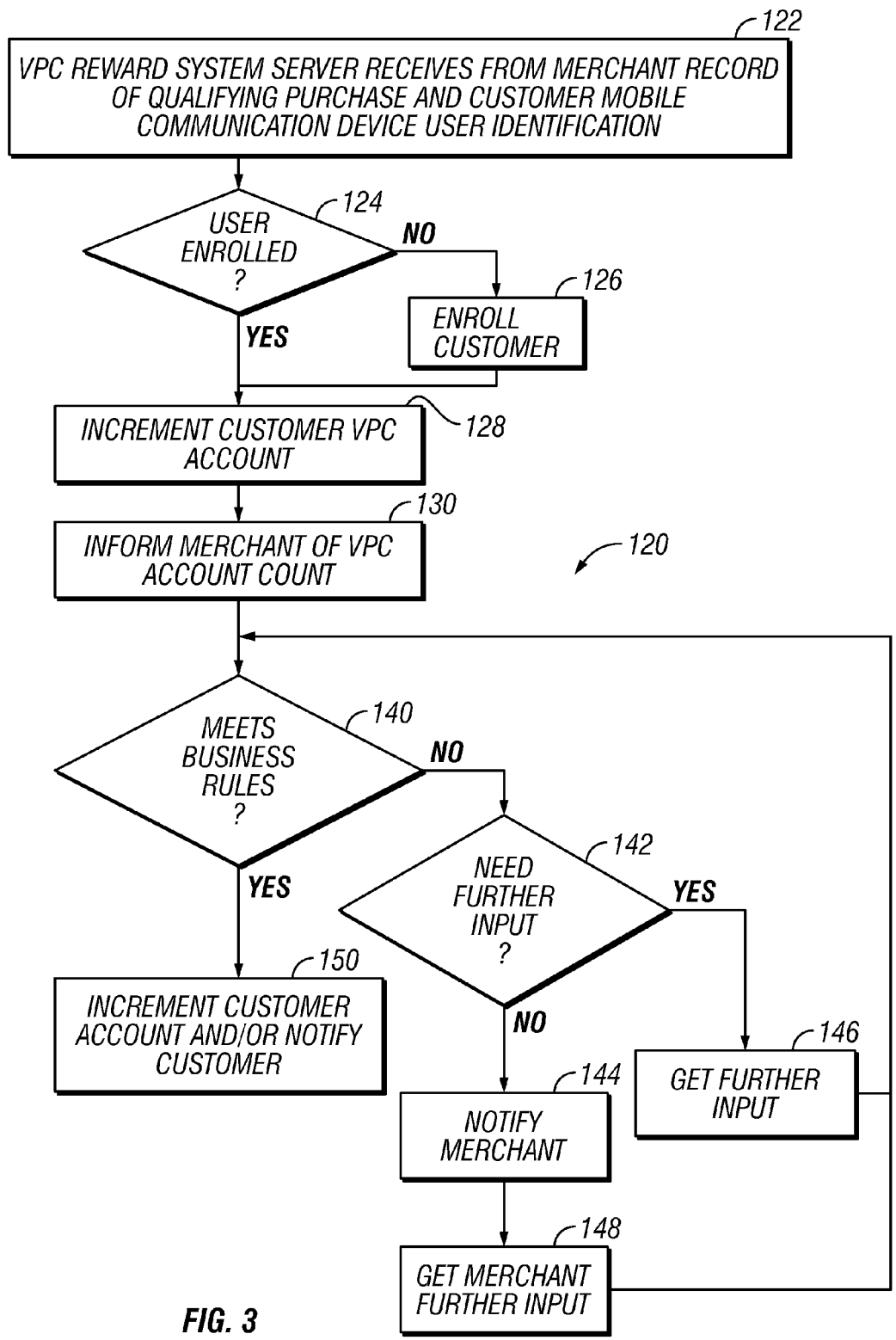
FIG. 3 shows in block diagram a flow of a method according to aspects of an embodiment of the disclosed and claimed subject matter.

Turning now to FIG. 3 there is illustrated in block diagram an example of a flow for a process 120 according to aspects of an embodiment of the disclosed subject matter. The process 120 may include the VPC reward system server receiving from a merchant a record of a qualifying purchase and the customer mobile communication device user identification in block 122. In decision block 124, the process can determine, e.g., utilizing the VPC system server 80 and database 82 at the connection provider or the merchant database 24 and server 20, whether the customer making the qualifying purchase (or at least a purchase that would be a qualifying purchase if the customer is enrolled) is, in fact, enrolled. If the customer is not enrolled, the system 120 can enroll the customer in block 126. The system 120 can then increment a count of VPC customer account reward points in block 130. The system can then inform the merchant and the customer in block 130 of the VPC points count in the customer's account.

The system 120 can then, either through the connection provider customer loyalty reward program VPC server or a server at the merchant, or both, examine available information about the customer. the information may be real time, e.g., status of the VPC account, location of the customer, etc. The information may also include historical information about the customer, e.g., from the customer profile or past responses to VPC promotions or the like. The VPC server or merchant server or merchant in person may determine, as an example using certain business rules, whether the customer meets a criterion for a special promotion, such as incrementation of the point amount by some bonus amount of points, or some other promotion. If so, in block '150 the customer's account can be so incremented and the customer so notified.

Alternatively, if more information is needed the VPC system in block 146 can seek further information, e.g., from the VPC database 82 or the merchant database 24 or some other information source. This additional information may relate, e.g., to time of day, etc. or location of the customer relative to the merchant or a competitor of the merchant, and like data as discussed in more detail above. The merchant may be notified by the system 120 in block 144 of the need for further information which may then be obtained by the system in block 148. the additional information from the merchant may include, e.g., that the merchant wants to offer some promotion to the customer in the form of more points or some other promotion in addition to or in lieu of points, also as discussed in more detail above. With the user of the further information from blocks 46 and 148, the system 120 can reevaluate the meeting of the requirements for incrementation and by what amount in block 140.

It will be understood by those skilled in the art that a system and method are disclosed which may comprise: determining if the customer is enrolled in a virtual punch card reward program service for which the qualifying purchase applies; and enrolling, via the communication network, the customer in the virtual punch card reward program if the customer is not enrolled. The system and method may further comprise: incrementing the customer reward program account points by the reward program server at the connection provider and determining, via the reward program server whether the points equal a predetermined threshold amount of points.

The system and method may further comprise: notifying at least one of the merchant and the customer of the reward program points being equal to the predetermined threshold amount of points and entitlement of the customer to a corresponding reward. The system and method may further comprise: notifying at least one of the merchant and the customer of a difference between the reward program account points and the predetermined threshold amount of points and receiving from the merchant a promotional offering to the customer of additional reward program points for a subsequent qualifying purchase. The system and method may further comprise: determining via the reward program server additional information about the customer entitling the customer to additional reward program points for a current qualifying purchase; and incrementing the customer reward program account by the additional points. The system and method may further comprise: receiving by the reward program system server from the customer a request that the merchant offer to the customer additional reward program points for a subsequent qualifying purchase.

Those skilled in the art will further understand that the system and method of the disclosed and claimed subject matter may allow the customer to organize a myriad of actual punch cards virtually on the Internet and with the connection provider server and/or the customer's mobile communication device, such as the customer's mobile phone to store and carry the VPC accounts and related information. These are tied to the customers mobile phone number. Various utilizations of the VPC information and data stored on the reward system server and its associated database can be utilized, e.g., for loyalty application and enrollment, web-based storage and sorting, e.g., based on distance to the merchant or a competitor of the merchant, as may be indicated by GPS or other phone locating utilities. The system can enable the customer to keep the VPC and account information first in mind when in the appropriate merchant establishment.

The merchant can issue credit for qualifying purchases by, among other ways, scanning phone number or bar code identifying the customer phone number. The system and method allows the merchant to integrate the VPC reward system and method with focused advertising, e.g., push button promotions. As an example, the reward system server can sort and present information to the merchant to, e.g., present a promotional extra number of points for customers who have not obtained a punch for some selected time and offer the extra punches for one subsequent qualifying purchase, or remind the customer who has not been in for a while that a relatively few number of qualifying purchases are needed to qualify for the reward, etc. The merchant may be periodically reminded of categories of customers that are likely to respond to one or more of the possible promotional offers based on current VPC reward account status and perhaps other information available about the customer, such as past punches, past responses to the enhanced points promotional offer or some other promotional offer to induce the customer to come to the merchants establishment and make a qualifying purchase.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least emulate a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and or application specific integrated circuit ("ASIC") customized logic circuitry, such as a controller or microcontroller, a digital signal processor, or any other form of device that can fetch instructions, operate on pre-loaded/pre-programmed instructions, and/or followed instructions found in hard-wired or customized circuitry to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions resulting from execution of the program code/instructions are performed by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metallization(s) interconnects of the base gate array ASIC architecture or selecting and providing metallization(s) interconnects between standard cell functional blocks included in a manufacturers library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

In one embodiment, a user terminal can be a computing device, such as a in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter is described with reference to block diagrams and operational illustrations of methods and devices to provide a system and methods according to the disclosed subject matter. It is understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, which executed by the computing device, e.g., on a processor within the computing device or other data processing apparatus, such that, when so executed, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram ay occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented therein. Alternative embodiments are contemplated in which the order of the various functions, functionalities and operations may be altered and in which sub-operations described as being part of a larger operation may be performed independently or performed differently than illustrated or not performed at all.

Although some of the drawings illustrate a number of operations in a particular order, functions, functionalities and/or operations which are not now known to be order dependent or become understood to not be order dependent may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

The disclosed subject matter is described in the present application with reference to one or more specific exemplary embodiments thereof. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense.

We claim:

1. A method comprising:

receiving, by a computer system comprising (a) a virtual punch card reward program server and (b) one or more network interfaces configured to provide access to one or more networks, an indication of an occurrence of a qualifying purchase by a customer at a first location corresponding to a merchant, including a mobile communication network user identifier unique to the customer and received from the customer by the merchant at a time of the occurrence of the qualifying purchase, wherein the indication is received by the one or more network interfaces;

accumulating, by the computer system, the occurrence of the qualifying purchase in a virtual punch card reward program account specific to the customer, as a reward program account punch;

processing, by the computer system, location information indicative of a current location of the customer at a time after the occurrence of the qualifying purchase, wherein the current location corresponds to a second location that is different from the first location, wherein the location information is determined by a global positioning system (GPS) receiver of a mobile device of the customer, wherein the mobile device further comprises a display, a processor, and a wireless communication transceiver, and wherein the location information is received by the one or more network interfaces;

identifying, by the computer system, the merchant or a second merchant based at least in part on a proximity of the merchant or the second merchant to the current location of the customer and a correlation of the merchant or the second merchant with the virtual punch card reward program account;

responsive to the identifying, sending, by the computer system and by the one or more network interfaces, a notification to one or both of the merchant and the second merchant indicative of the proximity;

receiving, by the computer system and by the one or more network interfaces, merchant input responsive to the notification, the merchant input corresponding to an offer for the customer, the offer corresponding to at least one of (a) an adjustment of business rules for reward parameters or (b) an adjustment of a punch amount with respect to a predetermined threshold associated with the virtual punch card reward program account, wherein the customer is entitled to a corresponding reward based at least in part on a comparison of the punch amount to the predetermined threshold; and sending, by the computer system and by the one or more network interfaces, an offer notification regarding the offer to the mobile device of the customer based at least in part on the proximity of the merchant or the second merchant to the current location of the customer and a correlation of the merchant or the second merchant with the virtual punch card reward program account, the offer notification configured to be displayed by the display of the mobile device.

2. The method of claim 1 further comprising:
determining that the customer is not enrolled in a virtual punch card reward program, for which the qualifying purchase applies; and
responsive to determining that the customer is not enrolled in the virtual punch card reward program, enrolling the customer in the virtual punch card reward program.

3. The method of claim 2 further comprising:
incrementing a customer program account punch, by the virtual punch card reward program server.

4. The method of claim 3 further comprising:
determining, by the virtual punch card reward program server, whether the punch amount equals a predetermined threshold punch amount.

5. The method of claim 4 further comprising:
notifying at least one of the merchant and the customer when the punch amount at least equals the predetermined threshold punch amount, and that the customer is entitled to a corresponding reward.

6. The method of claim 4 further comprising:
notifying at least one of the merchant and the customer of a difference between reward program account punch amount and the predetermined threshold punch amount.

7. The method of claim 6 further comprising:
receiving from the merchant a promotional offering to the customer of at least one additional reward program bonus punch for a subsequent qualifying purchase.

8. The method of claim 4 further comprising:
determining, by the virtual punch card reward program server, additional information about the customer entitling the customer to at least one additional reward program bonus punch for a current qualifying purchase; and
incrementing the customer reward program account punch amount by the at least one additional bonus punch.

9. The method of claim 6 further comprising:
receiving from the customer, by the virtual punch card reward program server, a request that the merchant offer to the customer at least one additional reward program bonus punch for a subsequent qualifying purchase.

10. A virtual punch card reward program system comprising:
one or more network interfaces configured to provide access to one or more networks;
one or more processors coupled to the one or more network interfaces, the one or more processors to execute instructions to:
receive, by the one or more network interfaces, an indication of an occurrence of a qualifying purchase by a customer at a first location corresponding to a merchant, including a mobile communication network user identifier unique to the customer and received from the customer by the merchant at a time of the occurrence of the qualifying purchase;
accumulate the occurrence of the qualifying purchase in a virtual punch card reward program account specific to the customer, as a customer reward program account punch;
process location information indicative of a current location of the customer at a time after the occurrence of the qualifying purchase, wherein the current location corresponds to a second location that is different from the first location, wherein the location information is determined by a global positioning system receiver of a mobile device of the customer, wherein the mobile device further comprises a display, a processor, and a wireless communication transceiver, and wherein the location information is received by the one or more network interfaces;
identify the merchant or a second merchant based at least in part on a proximity of the merchant or the second merchant to the current location of the customer and a correlation of the merchant or the second merchant with the virtual punch card reward program account;
responsive to the identifying, send a notification, by the one or more network interfaces, to one or both of the merchant and the second merchant indicative of the proximity;
receive, by the one or more network interfaces, merchant input responsive to the notification, the merchant input corresponding to an offer for the customer, the offer corresponding to at least one of (a) an adjustment of business rules for reward parameters or (b) an adjustment of a punch amount with respect to a predetermined threshold associated with the virtual punch card reward program account, wherein the customer is entitled to a corresponding reward based at least in part on a comparison of the punch amount to the predetermined threshold; and
send, by the one or more network interfaces, an offer notification regarding the offer to the mobile device of the customer based at least in part on the proximity of the merchant or the second merchant to the current location of the customer and a correlation of the merchant or the second merchant with the virtual punch card reward program account, the offer notification being configured to be displayed by the display; and
one or more storage media coupled to the one or more processors to retain the instructions.

11. The system of claim 10, wherein the one or more processors correspond to a virtual punch card reward program server, wherein: the virtual punch card reward program server is configured to determine that the customer is not enrolled in a virtual punch card reward program, for which the qualifying purchase applies; and
responsive to determining that the customer is not enrolled in the virtual punch card reward program, the virtual punch card reward program server is further configured to enroll the customer in the virtual punch card reward program.

12. The system of claim 11, wherein the virtual punch card reward program server is further configured to increment a customer reward program account punch amount.

13. The system of claim 12, wherein the virtual punch card reward program server is further configured to determine whether the punch amount at least equals a predetermined threshold punch amount.

14. The system of claim 13, wherein the virtual punch card reward program server is further configured to notify at least one of the merchant and the customer when the punch amount is at least equal to the predetermined threshold punch amount and that the customer is entitled to a corresponding reward.

15. The system of claim 13, wherein the virtual punch card reward program server is further configured to notify at least one of the merchant and the customer of a difference between the punch amount and the predetermined threshold punch amount.

16. The system of claim 15, wherein the virtual punch card reward program server is further configured to receive from the merchant a promotional offering to the customer of at least one additional reward program bonus punch for a subsequent qualifying purchase.

17. The system of claim 13, wherein the virtual punch card reward program server is further configured to:
    determine additional information about the customer entitling the customer to at least one additional reward program bonus punch for a current qualifying purchase; and
    increment the customer reward program account by the at least one additional bonus punch.

18. The system of claim 15, wherein the virtual punch card reward program server is further configured to receive from the customer a request that the merchant offer to the customer at least one additional reward program bonus punch for a subsequent qualifying purchase.

19. A non-transitory, machine-readable medium storing instructions that, when executed by a computing device, cause the computing device to perform a method comprising:
    receiving, by one or more network interfaces configured to provide access to one or more networks, an indication of an occurrence of a qualifying purchase by a customer at a first location corresponding to a merchant, including a mobile communication network user identifier unique to the customer and received from the customer by the merchant at a time of the occurrence of the qualifying purchase;
    accumulating the occurrence of the qualifying purchase in a virtual punch card reward program account specific to the customer, a customer program account punch;
    processing location information indicative of a current location of the customer at a time after the occurrence of the qualifying purchase, wherein the current location corresponds to a second location that is different from the first location, wherein the location information is determined by a global positioning system receiver of a mobile device of the customer, wherein the mobile device further comprises a display, a processor, and a wireless communication transceiver, and wherein the location information is received by the one or more network interfaces;
    identifying the merchant or a second merchant based at least in part on a proximity of the merchant or the second merchant to the current location of the customer and a correlation of the merchant or the second merchant with the virtual punch card reward program account;
    responsive to the identifying, sending a notification, by the one or more network interfaces, to one or both of the merchant and the second merchant indicative of the proximity;
    receiving, by the one or more network interfaces, merchant input responsive to the notification, the merchant input corresponding to an offer for the customer, the offer corresponding to at least one of (a) an adjustment of business rules for reward parameters or (b) an adjustment of a punch amount with respect to a predetermined threshold associated with the virtual punch card reward program account, wherein the customer is entitled to a corresponding reward based at least in part on a comparison of the punch amount to the predetermined threshold; and
    sending, by the one or more network interfaces, an offer notification regarding the offer to the mobile device of the customer based at least in part on the proximity of the merchant or the second merchant to the current location of the customer and a correlation of the merchant or the second merchant with the virtual punch card reward program account, the offer notification configured to be displayed by the display of the mobile device.

20. The non-transitory machine readable medium of claim 19, the method further comprising:
    determining that the customer is not enrolled in a virtual punch card reward program for which the qualifying purchase applies; and
    responsive to determining that the customer is not enrolled in the virtual punch card reward program, enrolling the customer in the virtual punch card reward program.

* * * * *